Jan. 10, 1928.
C. SCHMIDT
VEHICLE BUMPER
Filed May 7, 1927
1,655,976
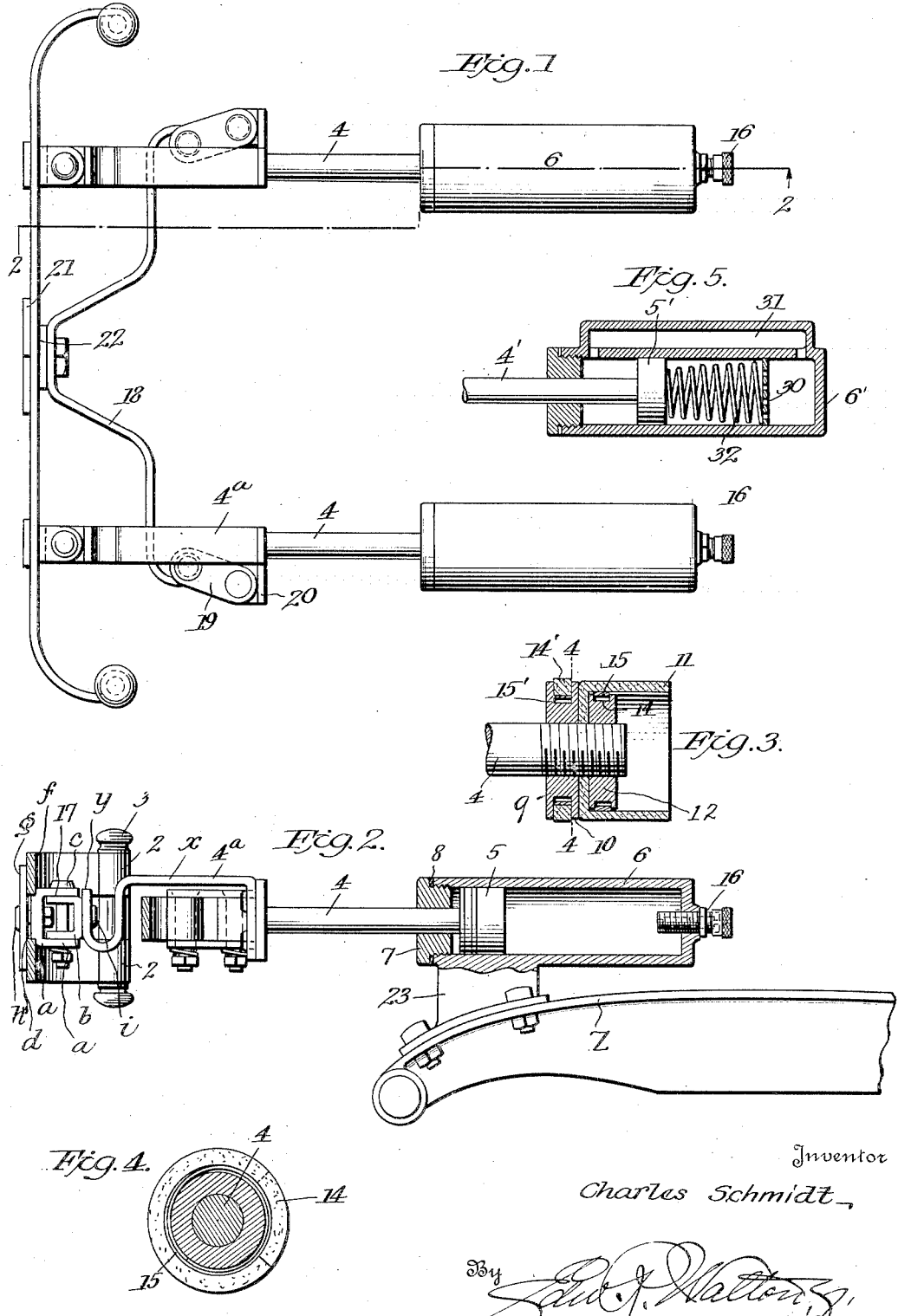

Patented Jan. 10, 1928.

1,655,976

UNITED STATES PATENT OFFICE.

CHARLES SCHMIDT, OF CLEVELAND, OHIO.

VEHICLE BUMPER.

Application filed May 7, 1927. Serial No. 189,658.

The present invention relates to bumpers for vehicles, used to absorb part of the shock or impact between the vehicle and another object.

It is well known that bumpers for this purpose have been provided of varying types and constructions, but it is the main object of the present invention to provide an efficient bumper which will withstand greater impact and is of such construction that regardless at what portion of the impact bar the shock is received, the same will be distributed equally to cushion or shock absorbing means supporting the impact bar; and further, in providing pneumatic cushioning means which operate against a sustained pressure.

The invention further contemplates a bumper of the above stated character which is extremely simple in construction and extremely durable.

Other objects and means of the invention, more or less specific than those referred to above, will be in part obvious and in part pointed out in the description of the elements, combination and arrangement of parts and applications of principle constituting the invention, and the scope of the protection contemplated will be indicated in the appended claims.

In this specification and the accompanying drawings, the invention is disclosed in the form in which it is considered to be the best, but the invention is not limited to such form because it is capable of being embodied in other forms; and it is to be understood that in and by the claims following the description herein it is intended to cover the invention in whatever form it may embody within the scope thereof.

In the accompanying drawings which show the preferred embodiment of the invention as at present devised:

Figure 1 is a plan view of the bumper;

Figure 2 is a longitudinal sectional view of the bumper taken on line 2—2 of the bumper of Figure 1 and showing the same attached to the horn of an automobile chassis;

Figure 3 is a sectional view through the piston head on the supporting arm;

Figure 4 is a transverse sectional view taken substantially on line 4—4 of Figure 3; and Figure 5 is a modified form of the cylinder of the cushioning means adapted for use with either air, gas or liquid.

The impact bar 1 may be of any suitable form or construction, but in the present instance is shown as comprising two superposed spaced parallel bars of resilient metal, each formed on its ends with an eye 2 through which connecting bolts 3 extend.

The impact bar is held in position at two points spaced, respectively, from the ends of the bar by supporting arms in the form of plungers 4 having piston-heads 5 slidably mounted in cylinders 6. The supporting arms 4 extend through the end cylinder wall 7 which is threadedly mounted on the cylinder with a washer 8 interposed between them to prevent the escape of air or liquid therefrom. Each head 5 comprises a disc member 9 (threaded on the inner end of the supporting arm 4 and having a sliding fit with the inner walls of the cylinder), and a flexible cup washer 11, preferably of leather, rubber or flexible metal being next placed against the washer 9 and held in position by a lock nut 12. The cup washer 11 may be held against the side walls of the cylinder by an expansion ring 14 positioned in a groove 15 in the washer 12, and the washer 9 may have also a groove 10 in which a packing ring 14' is disposed and expanded by the spring member 15'. Thus it will be seen that an airtight fit is provided between the piston head and the walls of the cylinder.

Air is maintained in the cylinder 6 at a desired pressure in order to keep the supporting arms 4 extended and to act to cushion the shock received on the impact bar 1. The air is admitted into the cylinder 6 through a suitable air valve 16 of the type ordinarily in use. The pressure may be replenished, increased or diminished, as desired, through the medium of the valve, when the suitable air-line is attached thereto.

In the present showing, the supporting arms 4 may include a bracket member $4^a$, of strip metal of suitable gauge, bent in substantially inverted U-formation at $x$ and having one leg secured or integral to the forward end of the arm or piston head 4 and the other leg (which is slightly longer) bent upon itself to complete another U portion $y$, as clearly shown in Figure 2. Both of the supporting arms 4 comprise the identical structure just recited and the impact bar is secured to the forward arms of the U portions $y$ by means of a shackle connection 17. Both of these shackles comprise U-shaped members $a$ and $b$ pivotally connected transversely through their legs by shackle bolts $c$.

The U-member $a$ of the shackle is connected to the impact bar 1 and has a boss, or projection, $d$ which extends between the spaced bars $e$ and $f$ of the impact bar and which co-operates with a clamping plate $g$ arranged against the outer face of the bars, the parts being clamped in position by the bolt $h$. The U-shaped member $b$ of the shackle 17 is secured to the bracket $4^a$ by the bolt or rivet $i$.

From the above description it will be seen that any impact on the bar 1 will be absorbed and cushioned in the cylinder 6, and that the bracket $4^a$, due to the resiliency of its material, may also absorb a portion of the shock, as will the impact bar itself.

In order to distribute the impact received on the bar 1 to both of the cushioning means 6, an equalizing strut 18 is provided in the form of a yoke member having its ends pivotally connected through shackles 19 to a bracket 20 on the arms 4, the intermediate portion of the strut 18 being forwardly offset and rigidly connected by means of clamping plates 21 and 22 to the center of the impact bar, as clearly indicated in Figure 1.

It is, therefore, manifest that an impact on the center of the bar 1, or between the supporting arms 4, will be equally distributed by means of the strut 18 to both of the supporting arms 4, and should the impact be received on the bar 1 at or near its ends, the shackles 17 and 19 will permit a relative shifting movement of the bar in sufficient degree to prevent any great damage thereto and to position the strut 18 so as to distribute the impact to both of the supporting arms 4.

The construction of the brackets $4^a$ is such as to accommodate the connection of the shackles 19 to the ends of the strut 18, the shackles underlie the inverted U-shaped portion $x$ of the brackets $4^a$, thus obscuring from ordinary view the details of construction and making the device more presentable in appearance. Furthermore, the compound U-shaped construction of the brackets $4^a$ particularly lend itself to absorb a good portion of the impact received on the bar 1 according to the degree of resiliency of material of which it is composed.

The bumper in its entirety is maintained on the horn of the automobile chassis, as shown in Figure 2, by providing a depending bracket 23 on the cylinders 6 and bolted or otherwise secured to the horn. The bracket 3 may be integral with the cylinder 6 or may be a separate attaching device.

In Figure 5 is shown a modified form of cylinder 6' which is adapted to contain oil as a cushion medium. With the parts in normally extended position, as substantially shown in Figure 5, pressure or impact upon the bumper will be transmitted to the plunger rod or arm 4' to move the plunger head 5' inwardly against the pressure of the spring. This movement will force or press the oil in back of the piston head and force it through the perforated plate 30, through the passage 31 to the forward end of the cylinder 6'. By reason of the perforated plate the flow of the oil will be suitably retarded or restricted to offer a yieldable resistance. When the force of the impact has been relieved, the spring 32 will return the piston to its normal extended position causing the oil or other suitable liquid in the cylinder to again flow in the opposite direction as just described.

Having thus described the invention what is claimed is:

1. A vehicle bumper comprising a horizontal impact bar, means supporting said impact bar in position at points near the ends thereof, a yoke member connected intermediate its ends to an intermediate portion of said impact bar between said supporting means, and shackle members having a floating pivotal connection with the ends of said yoke member, respectively, and fixedly pivoted to said supporting means at points remote from said impact bar.

2. A vehicle bumper comprising a horizontal impact bar, means supporting said impact bar in position at points near the ends thereof, a yoke member connected intermediate its ends to an intermediate portion of said impact bar between said supporting means and shackle members having a floating pivotal connection with the ends of said yoke member, respectively, and fixedly pivoted to said supporting means at points remote from said impact bar, said impact bar being pivotally connected to said supporting means.

3. A vehicle bumper comprising an impact bar, a pair of supporting means for the impact bar, each including a bracket of resilient material pivotally connected to said impact bar and bent upon itself to form reversed substantially U-shaped portions, a yoke-like strut member having an intermediate portion thereof secured to an intermediate portion of an impact bar between said supporting means, the ends of said yoke member being pivotally connected to said supporting means.

4. A vehicle bumper comprising an impact bar, a pair of supporting means for the impact bar, each including a bracket of resilient material pivotally connected to said impact bar and bent upon itself to form reversed substantially U-shaped portions, a yoke-like strut member having an intermediate portion thereof secured to an intermediate portion of an impact bar between said supporting means, the ends of said yoke member being pivotally connected to said supporting means at the rear end portion of said bracket.

5. A vehicle bumper comprising an impact bar, a pair of supporting means for the impact bar, each including a bracket of resilient material pivotally connected to said impact bar and bent upon itself to form reversed substantially U-shaped portions, a yoke-like strut member having an intermediate portion thereof secured to an intermediate portion of an impact bar between said supporting means, the ends of said yoke member being pivotally connected to said supporting means, said supporting means further including a plunger secured to the rear end of said bracket and mounted in a cylinder containing a compressible element.

6. A vehicle bumper comprising a horizontal impact bar, a pair of supporting arms for said impact bar connected at points near its ends, a yoke member connected intermediate its ends to an intermediate portion of said impact bar and further pivotally connected at its ends to said supporting arms, respectively, at points spaced from said impact bar.

7. A vehicle bumper comprising a horizontal impact bar, a pair of supporting arms for said impact bar connected at points near its ends, a yoke member connected intermediate its ends to an intermediate portion of said impact bar and further pivotally connected at its ends to said supporting arms, respectively, at points spaced from said impact bar, and a dash-pot connected with each arm, respectively, and normally maintaining it in extended position.

8. A vehicle bumper comprising a horizontal impact bar, means supporting said impact bar including rearwardly extending arms, said impact bar being pivotally connected to said supporting means to swing in a horizontal plane about said pivots.

9. A vehicle bumper comprising impact-receiving means and supporting means including a fluid-container cylinder, a plunger mounted in the cylinder, a by-pass communicating the end portions of the cylinder on opposite sides of the plunger, a perforated plate within the cylinder and spaced from its rear end in advance of said by-pass connection at said end, and a compression spring interposed between said plate and said plunger.

10. A vehicle bumper comprising impact-receiving means and supporting means including a fluid-container cylinder, a plunger mounted in the cylinder, a by-pass communicating the end portions of the cylinder on opposite sides of the plunger, means interposed in the passage of said fluid from the rear side of the plunger-head to the forward side thereof for retarding passage of fluid, and a spring for returning said plunger to normal position.

11. A vehicle bumper comprising an impact bar, spaced supporting means for the impact bar, each including a bracket compressible in a direction at substantially right angles with respect to said bar, and a connection between each bracket and said bar comprising a pair of U-shaped members and a connection between each bracket and said impact bar, each of said connections comprising a pair of U-shaped members having their leg-ends pivotally connected by substantially vertical arms passing therethrough, one of said U-shaped members having its closed end secured to the forward end of its respective bracket and the other U-shaped member being adjustably secured to the impact bar.

12. A vehicle bumper comprising an impact bar, supporting means for the impact bar, including a pair of spaced brackets of resilient material each pivotally connected at its end to said impact bar and bent upon itself to form a substantially U-shaped portion, and a yoke-like strut intermediately secured to said bar and having its end portions extending respectively into one of the U-shaped portions of each bracket and pivotally connected with said supporting means.

In testimony whereof I have hereunto set my hand.

CHARLES SCHMIDT.